July 23, 1946.　　　O. M. HARLOW　　　2,404,373
COMMODITY ELEVATING AND SAMPLING APPARATUS
Filed Aug. 2, 1943　　　2 Sheets-Sheet 1

INVENTOR
ORMAN M. HARLOW.
BY
ATTORNEY

July 23, 1946.    O. M. HARLOW    2,404,373
COMMODITY ELEVATING AND SAMPLING APPARATUS
Filed Aug. 2, 1943    2 Sheets-Sheet 2

INVENTOR
ORMAN M. HARLOW
BY
his ATTORNEY

Patented July 23, 1946

2,404,373

UNITED STATES PATENT OFFICE 2,404,373

COMMODITY ELEVATING AND
SAMPLING APPARATUS

Orman M. Harlow, Anaheim, Calif., assignor to Brogdex Company, Pomona, Calif., a corporation of California Application August 2, 1943, Serial No. 497,026

15 Claims. (Cl. 73—421)

This invention relates to commodity elevating and sampling apparatus, useful especially in sampling lemons, oranges, or other globular fruit, for example, incidental to determining the value thereof for the manufacture of by-products, such as citric acid and the like, or for juice-extraction purposes.

In the large-scale commercial handling of citrus and other fruits for market, it has become increasingly usual for a variable proportion of the fruit going through a packing house to be sent by the packer to other plants for working up into by-products or for juice extraction. Fruit thus utilized often consists mainly of culls or other relatively low grades that are difficult or impossible to market satisfactorily as fresh whole fruit. But crop and market conditions sometimes justify diverting much fruit of higher grades to by-product or juice extraction plants, so that a very considerable proportion of the total output of a packing house may sometimes go to such plants. In any case, the value of the fruit for these purposes, and consequently the money return which the owner ought to receive, depend upon such factors, for example, as its percentage of citrus acid content, and the quantity and various specific quality characteristics of its juice content. These factors are usually determined by laboratory test or assay which, in order to be accurately informative, must be made on a sample that is a truly representative average of the lot of fruit whose value is to be appraised.

Heretofore, in order to obtain such samples for laboratory test, it has been customary to remove manually, at intervals, a few specimens from the stream of fruit in which the given lot to be valued was traveling on a conveyor in being handled, the aggregate of such specimens so collected constituting the sample to be submitted to the laboratory for testing. This manual method of sampling is not only tedious and expensive in labor, but is also likely to be misrepresentative because the person doing the sampling may, unintentionally and subconsciously, make a selection of fruit not accurately representative of the lot, so that the resultant aggregate sample is not a fair average.

In commercially handling fruit through a packing house, for example, elevator conveyors of the bucket type are frequently made use of in conveying the fruit, in a traveling stream, from one level to another. According to the present invention, elevator conveyor construction of this general type is combined with means whereby small portions of the fruit carried by the conveyor are successively removed automatically, at regular intervals, to provide the necessary aggregate or composite laboratory test sample. It is one of the advantages of the invention that where it is desired to make use of an already existing elevator-conveyor installation of the well-known type referred to, in constructing the combined elevator and sampler of the invention, this can be done quickly, with only slight structural change in the existing bucket elevator installation.

Typical apparatus embodying the present invention comprises a bucket elevator including a plurality of buckets arranged in endless series and operable to receive fruit fed thereto, and to elevate and discharge fruit in the usual way from the top of the elevator; also having at least one special sampling or sample-carrying bucket, which is arranged to be tilted automatically at a given point below the top of the elevator and thereby deliver its contents to suitable sample-receiving means, separately from the main body of fruit which is discharged at the top of the elevator. The sampling bucket is mounted in the series in such manner as to be angularly movable or tiltable to dump its load; suitable actuating means being provided to cause such tilting movement of the sampling bucket at a predetermined point in its path of travel operatively adjacent the aforesaid sample-receiving means.

The effective capacity of the sampling bucket should be so related to the capacity of all the elevator buckets that the individual samples elevated and discharged by the tiltable sampling bucket will be a certain desired percentage of the fruit handled by the elevator in each cycle, the aggregate of these samples thus constituting a total or composite sample representing that same percentage of the entire lot of fruit handled. Therefore, where the elevator is a relatively short one, employing a comparatively small number of buckets, and where taking a sample equivalent to one regular bucket load at each cycle or circuit of the conveyor would give a larger sample percentage than desired, provision must be made to reduce the volume of fruit diverted by the sampling bucket from the main stream of fruit conveyed by the elevator. One way of accomplishing this is to have the sampling bucket of smaller capacity than the others. Another way is to employ actuating or tilting means for the sampling bucket that shall operate only in one out of any desired number of elevator cycles or passes. On the other hand, where the elevator has a relatively large number of conventional buckets, it may be necessary to have not merely one, but a plurality of sampling buckets, in order to obtain the requisite percentage of fruit for the test sample.

The invention will be more particularly described in connection with the accompanying drawings which illustrate one desirable practical embodiment thereof. In these drawings, Fig. 1 is a side elevation, partly in section and partly broken away, of a typical form of combined elevator and sampling apparatus embodying the invention;

Fig. 1—a is a side elevational detail of the sampling bucket and its mounting, on an enlarged scale;

Figure 1:
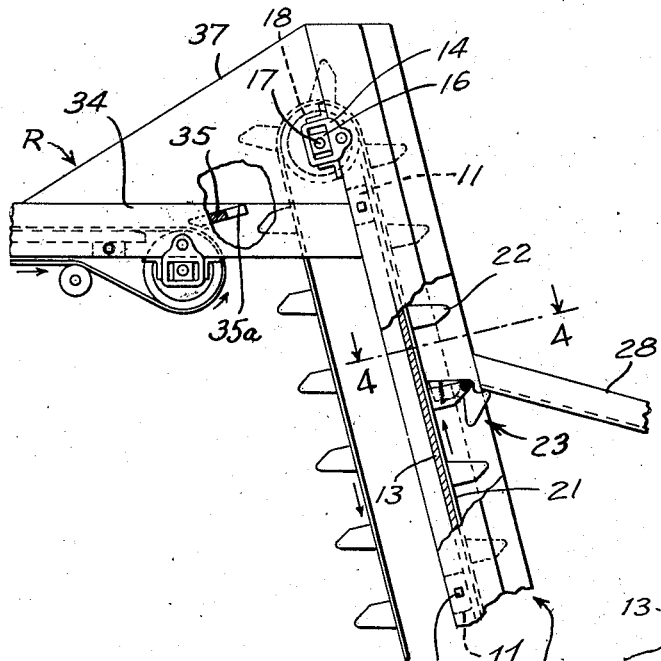
Figure 1A:
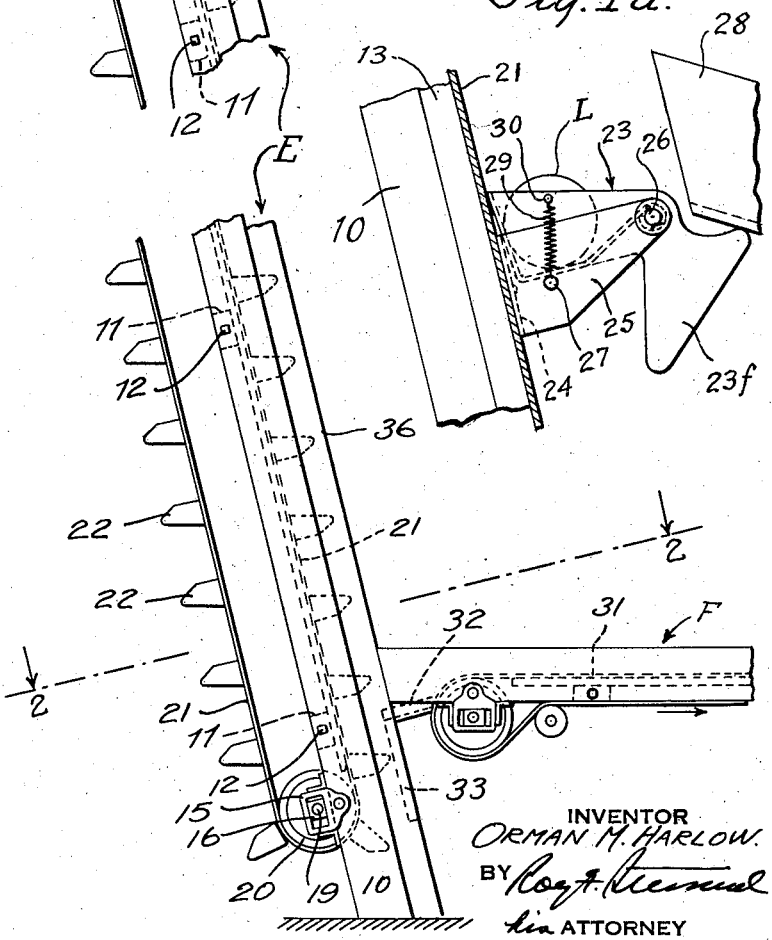

Referring to the drawings, and at first more particularly to Fig. 1, the bucket elevator indicated generally at E is, broadly speaking, of a type commonly known as a belt-and-bucket elevator, but modified to embody the invention. An endless belt, which may be made of heavy canvas plies for example, carries a series of sheet metal (e. g.) buckets suitably secured thereto and is trained around supporting drums at top and bottom, one of said drums being driven by suitable power means to impart continuous movement to said belt with its series of attached buckets. In the particular example here illustrated, the elevator is arranged to lift fruit from a lower to a higher level. The fruit (e. g. lemons) is fed by appropriate conveyor means indicated generally at F to the elevator near its lower end, is received by the successive buckets of the ascending conveyor run and carried by the buckets (except what is diverted by the special sampling bucket or buckets, as hereinafter explained) to the upper end of the conveyor where, through inversion of the buckets in rounding the upper drum, the fruit is discharged from the buckets and delivered to suitable receiving means, indicated generally at R, such as a chute or a horizontal conveyor, by which the fruit is directed or carried wherever desired, e. g. into storage bins. In order to facilitate delivery of the fruit to said receiving means, the elevator is inclined from the vertical, as shown.

Figure 2:
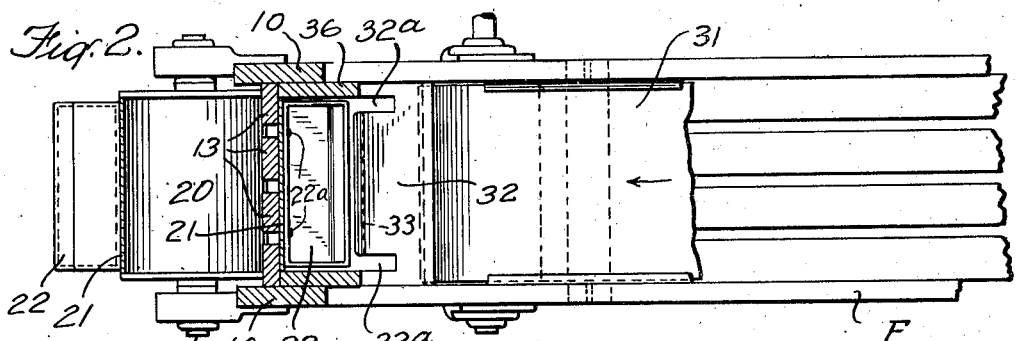
Fig. 2 is a transverse section on the line 2—2, Fig. 1.
Figure 4:
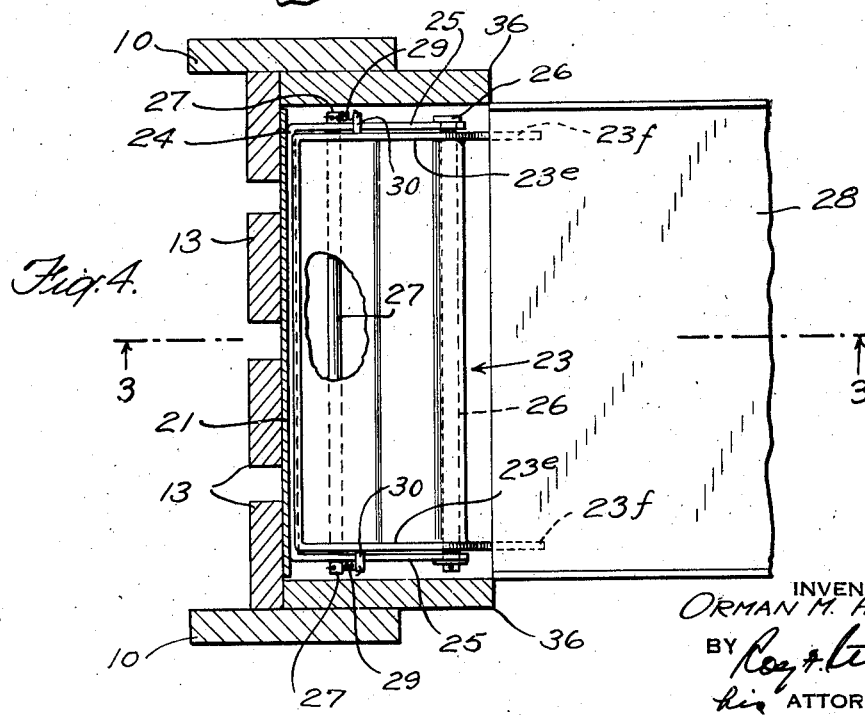
Fig. 4 is a transverse section on the line 4—4 of Fig. 1, on an enlarged scale.

In the specific embodiment of the invention shown in the drawings, the elevator has a frame comprising two inclined upright side members or stringers 10, Figs. 1, 2, and 4, suitably held together and spaced apart by cross-members 11, the ends of two of which are indicated in dotted lines in Fig. 1; the side members 10 being held to the cross-members 11 in any suitable way, as for example by bolts or lag screws 12, as indicated in Fig. 1. Suitable flooring is provided between the side members 10, this consisting in the present instance of a series of longitudinally extending slats 13, Figs. 2 and 4, secured to the cross-members 11. To the side members 10 are attached upper and lower pairs of transversely aligned slotted hangers 14 and 15, respectively. In the slot of each hanger is located a journal box 16 which is slidable in the hanger parallel to the side members 10. In the journal boxes of the upper pair of hangers is journaled a shaft 17, on which is fixed upper drum 18. The upper drum shaft 17 is intended to be driven by suitable power means, not shown, and may be extended at one end and provided with a pulley, gear or sprocket wheel, not shown, through which the said upper drum shaft may be driven from said power means. In the journal boxes of the lower hangers, 15, there is journaled a shaft 19 carrying lower drum 20.

Around the drums 18 and 20 passes an endless bucket-carrying means, in this case a belt 21. The sliding journal boxes 16 allow this belt to be tensioned by adjusting the said boxes in their respective hangers, suitable means being provided for such adjustment, as, for example, the usual adjusting screws (not shown) at each end of the respective journal boxes. The upper run of the belt travels in contact with the floor strips 13 and is supported thereby. A plurality of elevator-buckets of conventional construction, indicated at 22, are secured to the belt 21 in the usual way, as by rivets 22—a (Fig. 2) passing through the belt and through the contacting rear wall of each such bucket.

The construtcion thus far described in conventional and well understood by those skilled in the art.

In addition to the series of conventional buckets, the elevator is provided, in accordance with the invention, with at least one sample-carrying bucket indicated generally at 23, which is angularly movable in a bracket device secured to the belt. In the present example, the bracket device comprises a rear wall or base 24 which contacts the belt and may be secured thereto by rivets 24—a; also two bracket arms 25, one extending forwardly from each end of said rear wall in planes at right angles thereto. Between and suitably secured to said arms extend two rods, 26 and 27. Tie rod 26, located near the outer ends of said bracket arms and connecting the same, provides a hinge or pivotal mounting for the sampling bucket 23 upon the bracket; while a similar tie rod 27, located below the level of rod 26 and nearer the bracket base, serves as a rear support and stop for the pivoted sampling bucket in the normal position of that bucket shown in Figs. 1 and 1—a and in solid lines in Fig. 3. Rod 27 may additionally function as stop means to limit clockwise angular movement of the sampling bucket about the axis 26, as will be explained hereinafter.

Figure 3:
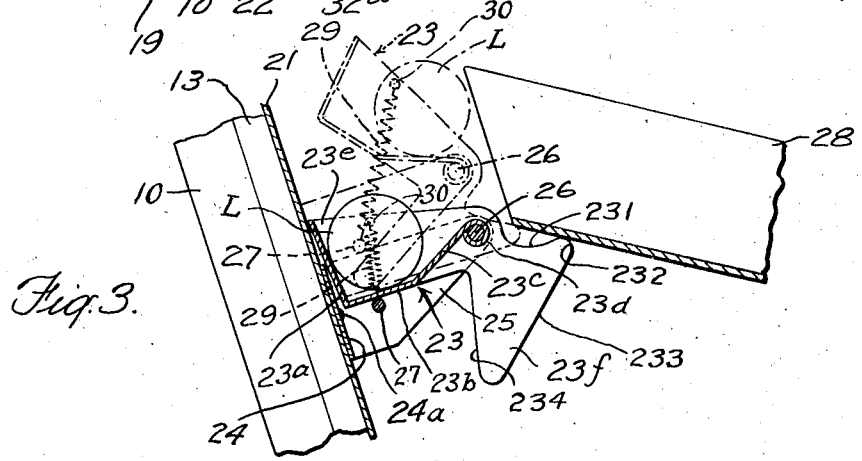
Fig. 3 is a detail side view in section on the line 3—3 of Fig. 4, also on an enlarged scale, illustrating the manner in which a sampling bucket is dumped.

In the embodiment of the invention here illustrated, the sampling bucket has a back-wall 23—a normally resting substantially flat against the bracket base, and a bottom 23—b merging into a front wall 23—c which slopes upward and forward to a front margin or discharge lip formed as a tube 23—d to receive the rod 26, as shown in cross-section in Fig. 3. The sampling bucket has also two end walls, indicated at 23—e, Figs. 3 and 4.

Within the scope of the invention, the requisite means for tilting the sampling bucket to dump its load of fruit for delivery to sample-receiving means may take any of various suitable forms. In the specific embodiment of the invention here illustrated, each of the end walls 23—e of the sampling bucket has an extension 23—f projecting outwardly beyond the discharge lip 23—d to provide an actuating contact arm or lever which, at the proper point in the upward travel of the sampling bucket, engages a fixed abutment, in this instance the bottom of stationary sample-receiving chute 28, the chute being so mounted in any appropriate manner that its open receiving end projects into the path of upward travel of the two contact arms of the sampling bucket, but is wholly outside the path of travel of the outermost portions of bracket arms 25 and of the regular or conventional buckets of the elevator series. Thereupon, further upward travel of the sampling bucket causes it to be tilted or swung clockwise about the horizontal axis provided by pivot rod 26 until its eventually attains the dotted-line position shown in Fig. 3, to dump its load of fruit, indicated conventionally at L, into chute 28 which conducts it to a sample bin or other suitable receptacle (not shown) in which the desired representative average sample is to be accumulated. By suitably recessing or concaving the upper edge of each said contact lever to provide adequate clearance, as indicated at 231, so that only the rounded outer ends or corners 232 of the levers contact the chute as the sampling bucket ascends, the angular tilting movement of the bucket occurs gradually and smoothly.

As the ascent continues, the lever ends 232, which have meanwhile been sliding inwardly (toward the left in Fig. 3) in contact with the under side of the chute bottom, and which are in planes well inside those of the vertical side walls of the chute (Fig. 4), finally ride over the edge of the chute bottom. In this position the sampling bucket is tilted to the maximum angle which may be, for example, 45° from its initial or normal position.

Because of the unbalanced distribution of its weight with respect to pivot rod 26, the sampling bucket now tends to swing back counter-clockwise, by gravity, to said normal position, its center of mass being to the left of the pivotal axis 26 (Fig. 3); and within the broad scope of the invention, it may be permitted to do so freely as soon as the lever ends 232 clear the chute bottom in the continued ascent of the sampling bucket. However, since too rapid a return of the bucket to normal position would result in a sharp slam or bang, thus causing noisy operation and unnecessary wear on the mechanism, provision is most desirably made to control such return in such manner that it occurs more gradually and not too rapidly. To this end, in the specific arrangement illustrated, each of the bucket side wall extensions 23—f includes a depending portion, having a substantially straight edge 233 of such length and so spaced from the rod 26 that, in the continued upward travel of the bucket, as soon as lever ends 232 clear the chute bottom edge and the sample bucket starts to swing back to normal position, said edge 233 is caused, through the leverage exerted by the bucket about its axis 26, to bear against said chute bottom edge, and continue to do so until the bucket has substantially completed its return swing at the controlled rate permitted by said edge, which thus acts lie a slow-return cam.

If for any reason, such as an unusually rapid rate of elevator operation for example, there should be a tendency on the part of the sampling bucket, when tilted into dumping position by the described actuating means, to swing clockwise through a greater angle than is desirable, such excessive angular swing is prevented by the inner or rear face 234 of each triangular cam-like extension 23—f striking tie-rod 27, which thus serves as stop means limiting angular movement of the bucket clockwise as well as counter-clockwise.

The controlled return swing of the sampling bucket by gravity may be rendered more positive, if desired, through provision of coiled springs 29, one at each end of the bucket, each fastened at one end to tie rod 27 and at the other to a stud 30 projecting from end wall 23—e of the bucket. These springs, which are strongly tensioned at the position of maximum bucket tilt, supplement the action of gravity in holding the slow-return cam face or edge 233 firmly against the edge of the delivery chute bottom until said edge is cleared by member 23—f in the continued ascending movement of the sampling bucket as a whole in company with the other buckets in the upper run of the elevator series.

Said springs 29 perform a further useful function in that they hold the sampling bucket in its normal retracted position (i. e. seated against tie rod 27 and/or bracket base 24) as the bucket passes over upper drum 18 and during its downward travel in the lower run of the elevator.

The above described arrangement of parts contributes materially to relatively quiet and smooth operation of the sampling bucket in the various phases of its travel as a part of the elevator bucket series, and therefore constitutes an important feature of the invention in its more specific aspects.

Fruit is fed to the elevator apparatus at its lower end in the usual manner by the horizontal conveyor apparatus F, the endless belt 31 of which discharges fruit over sloping delivery board 32 into the elevator buckets as they successively ascend into loading position; said delivery board differing from the conventional delivery board by being provided with marginal notches or slots 32—a, adjacent its ends, in order to allow passage therethrough of the lever arms 23—f of the sampling bucket. Depending apron 33, which is provided to keep individual fruits from occasionally bouncing forward and out as they drop into the successive buckets from delivery 32, is here shown as narrower than the distance between the actuating arms 23—f of the sampling bucket and so centered that said arms clear its ends in their travel. If desired, said apron could be made wider and notched or slotted marginally, like delivery 32, to provide the necessary clearance.

With the exception of the sampling bucket, which is tilted before it reaches the upper end of the elevator, to dump its load into chute 28 for delivery to the sample-collecting box or bin, all the buckets travel to the upper end of the elevator and discharge their loads of fruit to conveyor 34 over the delivery board 35, the latter also having marginal clearance slots or notches 35—a like those of delivery board 32, to allow passage of the sampling bucket lever arms. The usual side boards or housing may be provided, as indicated at 36 and 37, to prevent accidental loss of fruit from the apparatus while it is being elevated and delivered to the upper level conveyor 34.

The percentage of the total fruit handled by the elevator that is removed and diverted as a sample by the sampling bucket depends, obviously, upon the ratio between the capacity of the sampling bucket and the aggregate capacity of all the buckets in the series. Where an average sample representing as little as 1 per cent or less of a given lot of fruit being handled is as large as is desired for laboratory test, as is frequently the case, and where the fruit is to be elevated only a short distance, thus requiring the use of a short elevator employing a relatively small number of buckets, too large a percentage of fruit would be diverted to the sample bin by a sampling bucket having the same carrying capacity as the conventional buckets in the series. In such cases, the sampling bucket may be constructed and arranged to extend only part way across the endless belt or other endless bucket-carrying means, instead of across its full width as do the conventional buckets; the other dimensions either remaining the same or being also reduced if necessary. Thus, in the case of a 34-bucket elevator of the belt and bucket type, replacing one of the conventional buckets, in accordance with the invention, by a sampling bucket whose length, in the direction of the belt width, is only one-third that of the conventional buckets, but which is otherwise of the same dimensions as they, will result in a combined elevator and sampler operative to divert substantially 1 per cent of the handled stream of fruit to the sample bin.

Thus, the apparatus of the invention is readily arranged to meet the varying requirements of a combined elevator and sampler, since it is relatively easy to replace a conventional bucket with a sampling bucket, or to replace a given sampling bucket with one of a different capacity.

What is claimed is:

1. In a combined elevator and sampling apparatus particularly suitable for sampling plant products, the combination, with means for delivering at one level material to be sampled, means for removing at a higher level material which has been sampled, and means for receiving at an intermediate level samples which have been taken, of an endless bucket elevator mechanism comprising a plurality of elevator buckets constructed and arranged to be loaded by such delivering means and to discharge their respective contents only at said higer level to the means for removing material which has been sampled, said endless bucket elevator mechanism also comprising at least one tilting sampling bucket arranged to be loaded at the low level by the delivery means, and means at said intermediate level for tilting only such a sampling bucket to cause it to discharge to said sample-receiving means.

2. Elevating and sampling apparatus comprising an elevator frame, endless carrier means supported thereby for travel thereon, a series of elevator buckets carried by said endless means, means for feeding articles to the series of buckets near the foot of the elevator and means for receiving articles delivered at the top of the elevator, said series of elevator buckets comprising a plurality of buckets constructed and arranged to discharge their respective contents only to the receiving means at the top of the elevator, and also comprising at least one elevating and sampling bucket which is tiltably mounted upon said endless carrier means and has an actuating extension projecting outside the path of travel of the other buckets; in combination with a stationary abutment located outside said path of travel but engaged by said actuating extension as the loaded sampling bucket travels upward, before it reaches the delivery end of the elevator, to cause tilting of said bucket and discharge of its load.

3. Elevating and sampling apparatus comprising an elevator frame, endless carrier means supported thereby for travel thereon, a series of elevator buckets carried by said endless means, means for feeding articles to the series of buckets near the foot of the elevator and means for receiving articles delivered at the top of the elevator, said series of elevator buckets comprising a plurality of buckets constructed and arranged to discharge their respective contents only to the receiving means at the top of the elevator, and also comprising at least one elevating and sampling bucket mounted on said endless carrier for angular movement about a substantially horizontal axis from normal load-carrying position into dumping position, an actuating lever operatively associated with said sampling bucket and projecting outside the path of travel of the other buckets; in combination with stationary sample-receiving means located outside said path of travel but having a portion that is engaged by said lever as the loaded sampling bucket travels upward, before it reaches the delivery end of the elevator, to cause tilting of said bucket and discharge of its load into said sample-receiving means.

4. Elevating and sampling apparatus comprising an elevator frame, endless carrier means supported thereby for travel thereon, a series of elevator buckets carried by said endless means, means for feeding articles to the series of buckets at one level, and means for receiving articles discharged at a higher level, said series of elevator buckets comprising a plurality of buckets constructed and arranged to discharge their respective contents only to the receiving means at said higher level and also comprising at least one elevating and sampling bucket which is tiltably mounted upon said endless carrier means in association with an actuating member projecting outside the path of travel of the other buckets; in combination with detent means arranged outside said path of travel but engageable by said actuating means to cause tilting of said bucket and discharge of its contents at a level intermediate the two levels aforesaid, said actuating means and detent means beng constructed and arranged to cooperate in rendering the tilting movement of said sampling bucket relatively gradual.

5. Elevating and sampling apparatus comprising an elevator frame, endless carrier means supported thereby for travel thereon, a series of elevator buckets carried by said endless means, means for feeding articles to the series of buckets at one level, and means for receiving articles discharged at a higher level, said series of elevator buckets comprising a plurality of buckets constructed and arranged to discharge their respective contents only to the receiving means at said higher level and also comprising at least one elevating and sampling bucket which is tiltably mounted upon said endless carrier means in association with an actuating member projecting outside the path of travel of the other buckets; in combination with detent means arranged outside said path of travel but engageable by said actuating means to cause tilting of said bucket and discharge of its contents at a level intermediate the two levels aforesaid, said actuating means and detent means being constructed and arranged to cooperate in rendering both the tilting movement of said sampling bucket, and also its return movement, relatively gradual.

6. Combined elevator and sampler apparatus comprising an elevator, arranged to receive articles at one level and to discharge them at a higher level, comprising upper and lower rotary supporting means, endless traveling carrier means trained about the same, and a series of elevator buckets each having a substantially horizontal outer or front edge, mounted on said endless carrier means with the outer or front edges of the series aligned substantially parallel in the ascending run, said series of elevator buckets comprising a plurality of buckets constructed and arranged to discharge their respective contents only at the higher level, and also comprising at least one elevating and sampling bucket whose mounting includes a bracket upon which the bucket is pivoted for angular movement, about an axis adjacent and parallel to its outer or front edge, from its normal load-carrying position into dumping position, an actuating member extending from the pivoted bucket outside the path of travel of the other buckets; in combination with an abutment located outside said path of travel but arranged to be engaged by said actuating member, during the ascent of said pivoted bucket and before it reaches said higher level, thereby to tilt said bucket into dumping position.

7. Apparatus as set forth in claim 6, wherein said actuating means comprises a lever arm having a cam-like portion adapted and arranged to engage said abutment with a cam surface so shaped and proportioned that it continues to bear against said abutment substantially throughout the tilting of the bucket into dumping position and its return to normal position.

8. Apparatus as set forth in claim 6, wherein said actuating means comprises a lever arm having a cam-like portion adapted and arranged to engage said abutment with a cam surface so shaped and proportioned that it continues to bear against said abutment substantially throughout the tilting of the bucket into dumping position and its return to normal position, and wherein resilient means connecting said sampling bucket and its bracket mounting yieldingly resists said tilting and tends to maintain the aforesaid continued bearing of said cam surface against said abutment; said resilient means also acting to prevent tilting of the sample bucket after it reaches the top of the elevator and while it descends.

9. In combined elevator and sampler apparatus, an elevator for conveying articles from a lower to a higher level comprising an upper driven drum, a lower drum, endless bucket-carrying means arranged to travel around both drums, a plurality of conventional elevator buckets secured to said endless bucket-carrying means, and constructed and arranged to discharge their respective contents only at the higher level, and means at said higher level to receive such discharge from the conventional elevator buckets, in combination with sampling mechanism comprising a bracket device secured to said bucket-carrying means, an elevating and sampling bucket mounted on said bracket for angular movement between carrying and dumping positions and provided with actuating means, and sample-receiving means located at a level intermediate the lower and higher levels, said sample-receiving means including a part located at a level lower than the upper end of the elevator and presenting an abutment in the path of ascent of said actuating means to engage therewith and thereby dump the load of the sampling bucket into said sample-receiving means.

10. In combined elevator and sampler apparatus, an upper driven drum, a lower drum, an endless belt arranged to travel around both drums, a plurality of conventional elevator buckets secured to said belt, and constructed and arranged to discharge their respective contents only when passing around the upper drum, and means adjacent the upper drum to receive such discharge from the conventional elevator buckets, in combination with sampling bucket mechanism also carried by said belt, said mechanism comprising a bracket device secured to the belt, a sampling bucket mounted for angular movement in said bracket device and provided with actuating means, and sample-receiving means located at a level lower than the upper end of the elevator and presenting an abutment in the path of ascent of said actuating means to engage the same and thereby dump the contents of the sampling bucket into said sample-receiving means.

11. In combined elevator and sampler apparatus comprising an elevator having an upper driven drum and a lower drum, endless bucket-carrying means passing around said drums, and a plurality of conventional buckets secured to the endless bucket-carrying means, the combination, with said elevator, of sampling bucket mechanism comprising a bracket device having a base secured to said endless bucket-carrying means and two forwardly extending arms, a tie rod connecting said arms, a sampling bucket having a tubular discharge lip through which said tie rod passes to provide an axis of support about which said bucket may be tilted, said sampling bucket also having side walls provided with tilting arms which extend outward beyond said tubular discharge lip, and a sample-receiving chute located below the upper end of the elevator and extending into the path of ascent of said tilting arms, whereby said bucket is dumped when the tilting arms contact said chute.

12. Apparatus as set forth in claim 11, which further includes resilient means acting to return the sampling bucket to its normal position, and stop means carried by said bracket against which said bucket is retained in its normal position by said resilient means.

13. In combined elevator and sampler apparatus, comprising an elevator having an upper driven drum and a lower drum, endless bucket-carrying means passing around said drums, and a plurality of conventional buckets secured to the endless bucket-carrying means, the combination, with said elevator, of a sampling bucket mechanism, comprising a bracket device having a base secured to said endless bucket-carrying means and provided with two forwardly extending arms, a front tie rod of circular cross-section and a lower tie rod, both rods extending through the bracket arms and being secured to each, a sampling bucket having its front end fulcrumed on the front tie rod for angular movement thereon, said samping bucket having a bottom arranged to rest on the lower tie rod when the bucket is in normal position, and also having side-walls extending beyond the front rod to provide tilting means, a spring at each side of the bucket connected to the lower rod and to a side wall of the bucket, to return the bucket from dumping to normal position, and a sample-receiving chute located below the upper end of the elevator and presenting an abutment extending into the path of travel of the said tilting means of the sample-carrying bucket, whereby said bucket is dumped when it arrives at said conveyor.

14. Apparatus as set forth in claim 6, which further comprises means for delivering articles to the lower end of the elevator, and means for receiving articles discharged from the upper end of the elevator, both such delivering and receiving means including a delivery board which extends into the path of travel of said actuating member but is formed to provide clearance therefor.

15. Apparatus as set forth in claim 6, wherein said actuating means comprises a lever arm having a cam-like portion adapted and arranged to engage said abutment with a cam surface so shaped and proportioned that it continues to bear against said abutment substantially throughout the tilting of the bucket into dumping position and its return to normal position; said apparatus further comprising means for delivering articles to the lower end of the elevator, and means for receiving articles discharged from the upper end of the elevator, both such delivering and receiving means including a delivery board which extends into the path of travel of said actuating member, but is marginally notched or slotted to provide clearance therefor.

ORMAN M. HARLOW.